March 14, 1933.  P. R. NELSON  1,901,185
SUBMARINE MINE CONTROL
Filed Nov. 12, 1928  5 Sheets-Sheet 1
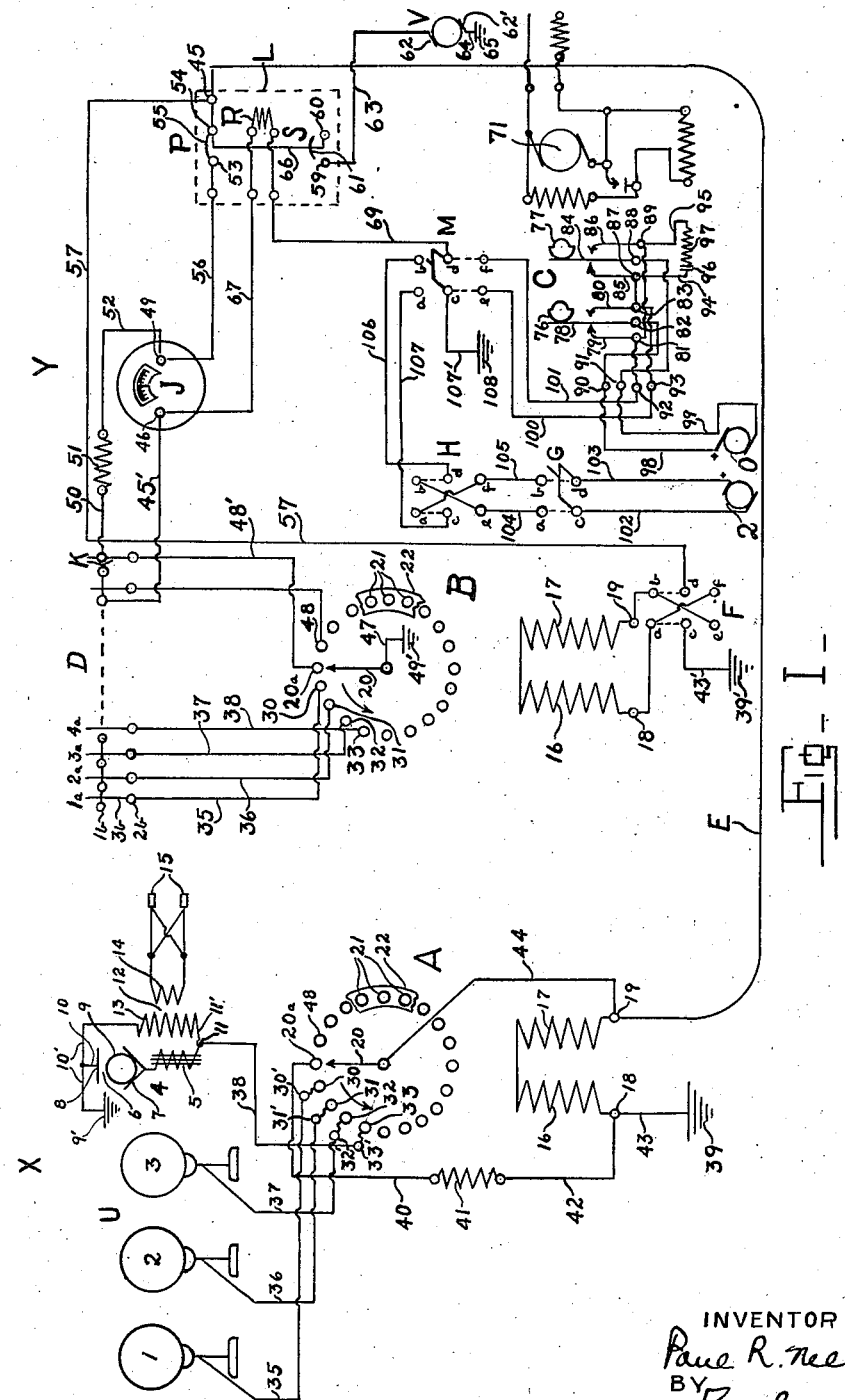
INVENTOR
Paul R. Nelson
BY
ATTORNEY March 14, 1933.  P. R. NELSON  1,901,185
SUBMARINE MINE CONTROL
Filed Nov. 12, 1928  5 Sheets-Sheet 2
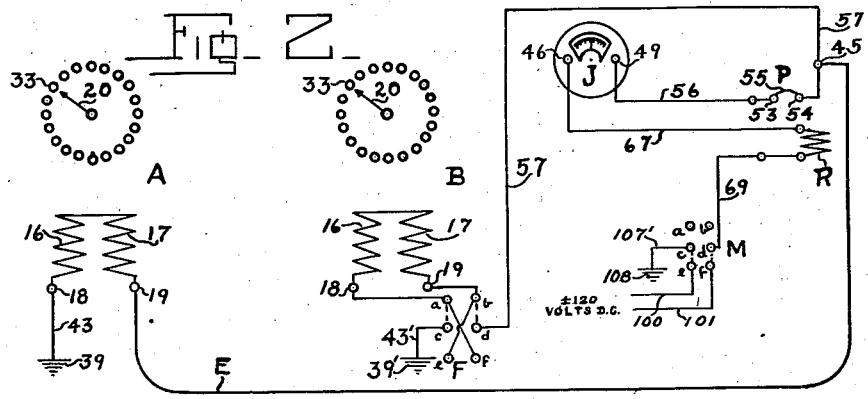
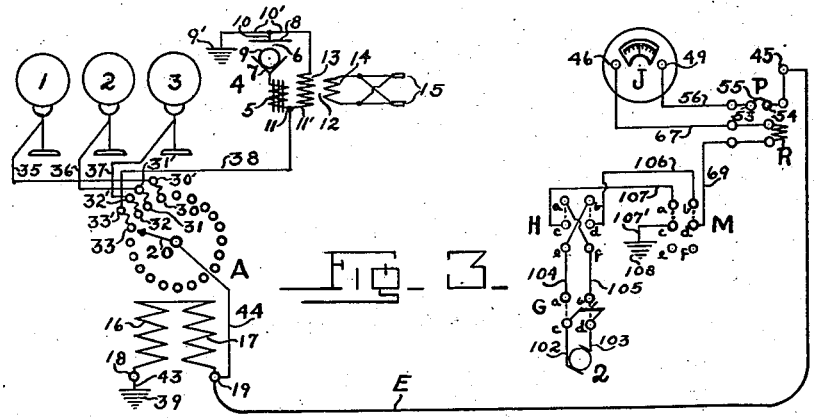
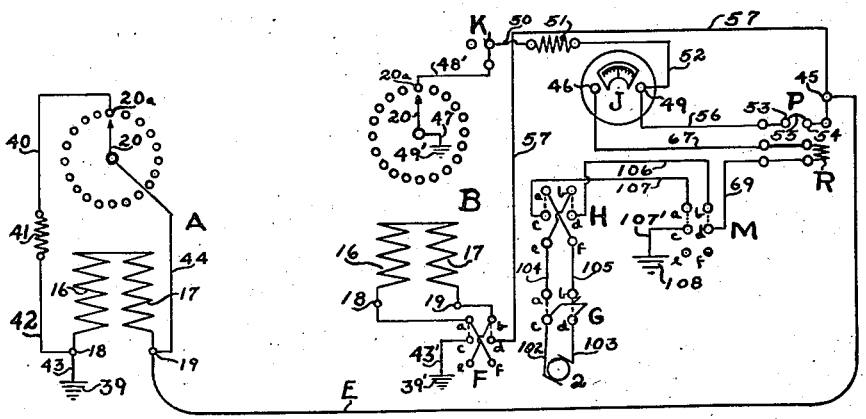
INVENTOR
Paul R. Nelson
BY
ATTORNEY March 14, 1933.                    P. R. NELSON                    1,901,185
                              SUBMARINE MINE CONTROL
                           Filed Nov. 12, 1928          5 Sheets-Sheet 3
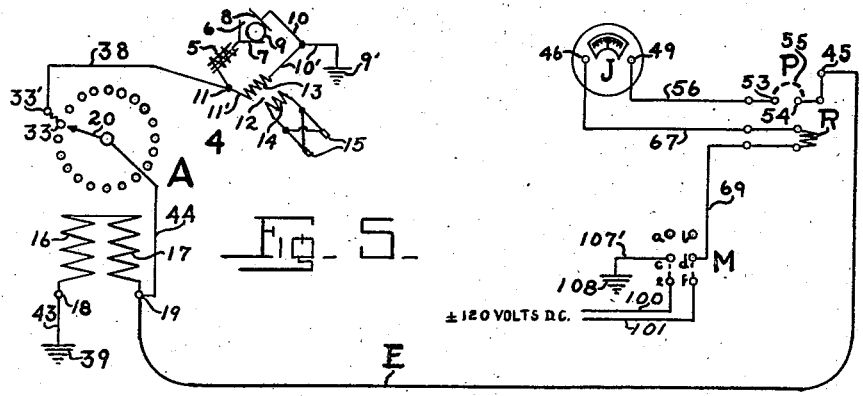
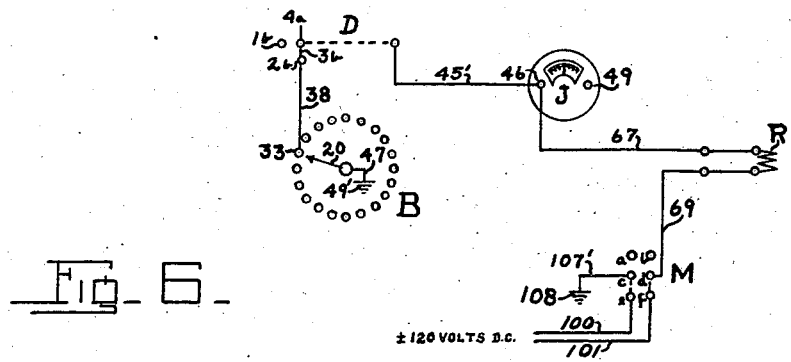
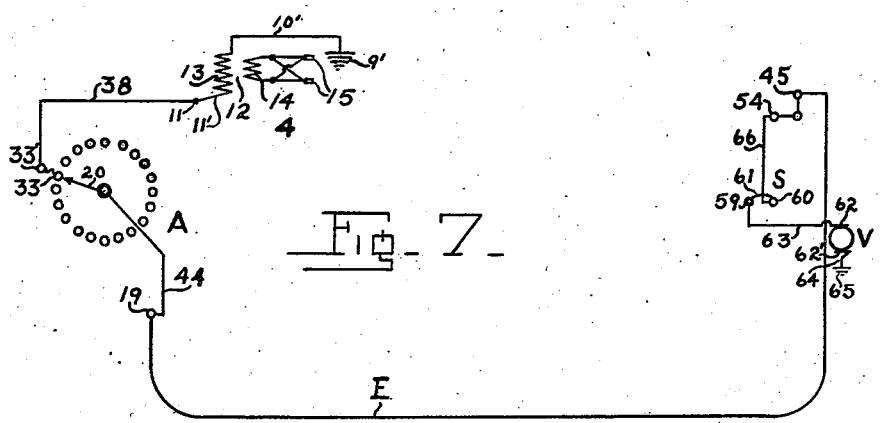
INVENTOR
Paul R. Nelson
BY
ATTORNEY March 14, 1933.  P. R. NELSON  1,901,185
SUBMARINE MINE CONTROL
Filed Nov. 12, 1928   5 Sheets-Sheet 4

INVENTOR
Paul R. Nelson
BY
Jos. I. McCauley
ATTORNEY

March 14, 1933.  P. R. NELSON  1,901,185
SUBMARINE MINE CONTROL
Filed Nov. 12, 1928  5 Sheets-Sheet 5
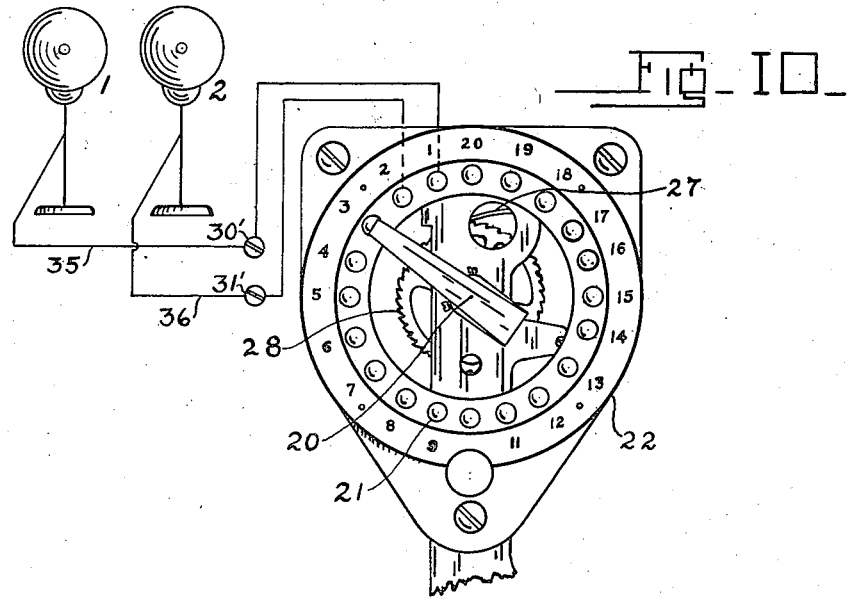
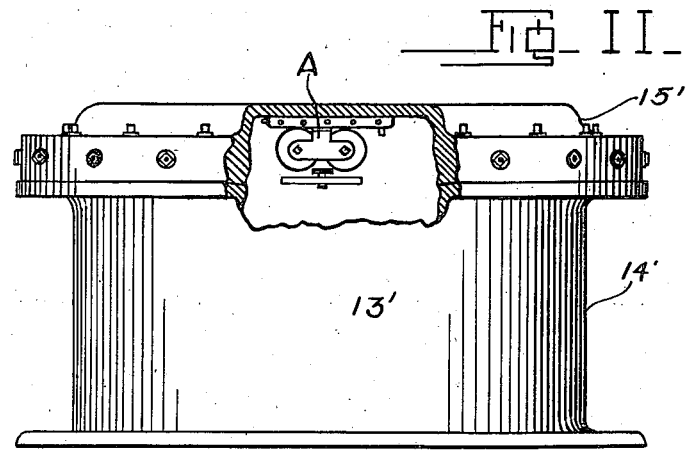
INVENTOR
Paul R. Nelson
BY
ATTORNEY Patented Mar. 14, 1933

1,901,185

UNITED STATES PATENT OFFICE

PAUL R. NELSON, OF FORT TOTTEN, NEW YORK, ASSIGNOR TO THE SECRETARY OF WAR, IN BEHALF OF THE UNITED STATES

SUBMARINE MINE CONTROL

Application filed November 12, 1928. Serial No. 318,930.

(GRANTED UNDER THE ACT OF MARCH 3, 1883, AS AMENDED APRIL 30, 1928; 370 O. G. 757)

This invention described herein may be manufactured and used by or for the Government for governmental purposes, without the payment to me of any royalty thereon.

This invention relates to a system of submarine mine control, more especially it is directed to a system utilizing a single conductor between the mine group to be controlled and a casemate or shore station.

One object of this invention is to provide a system of the character indicated wherein a group of mines suitably submerged off shore may be controlled from a casemate or shore station to render the mines harmless or permit the firing thereof either manually or automatically.

Another object of this invention is to provide a system embodying a group of submerged mines remotely situated with respect to the casemate or shore station, each group being controlled by a selector located in its midst and actuated from the shore station by means of a single conductor.

Another object of this invention is to provide a system of submarine mine control including a group of mines submerged off shore, a selector situated in the midst of the mine group and coacting therewith to distribute electrical energy to the components of the group, a selector located at the casemate and synchronized with respect to the off shore selector whereby the operator at the casemate or shore station may be informed at any time which mine in the group is operatively connected to the casemate control circuits.

Another object of this invention is to provide a system of mine control including a pair of selectors, one being situated at the casemate or shore station the other being located in the midst of the mine group the respective selectors being connected electrically by a single conductor and having a circular series of contacts adapted to be engaged by a rotary contact, the speed of which is such that if a vessel of the highest speed and maximum length capable of obtaining such speed, contacts with a mine just after the rotary contact of the selector has left the contact for that mine, said rotary contact will return to the same mine contact after making a complete revolution before the vessel has passed entirely over the mine and prior to the restoration of the mine to its initial position.

Another object of this invention is to provide a single conductor submarine mine control system including a plurality of mines suitably submerged off shore, a selector submerged in the midst of said mine, the selector including an annular series of contacts each of which is connected with one of the mines, said contacts being engaged by a rotary contact electromagnetically controlled to successively engage the respective contacts, a casemate or shore station, a similarly constructed selector located at the shore station and operated in synchronism with the off shore station to which it is connected by means of a single conductor and means in connection with the casemate selector to retain the rotary contact of both selectors in engagement with any predetermined contact for the purpose of firing any selected mine.

Another object of this invention is to provide a system of the character indicated having means controlled and operated from the casemate for automatically firing any mine of a group when said mine has been sufficiently tilted by contact to establish the requisite firing circuit.

Another object of this invention is to provide a system including means situated at the casemate for restoring both the casemate and distant selector to a synchronized condition after the degree to which one precedes or lags the other has been ascertained.

Other objects of this invention are; to provide means for restoring the rotary contacts of both distant and casemate selectors to a synchronized condition; to produce a system which is comparatively simple to construct and inexpensive with respect to manufacture, installation and maintenance; to afford a system the operating mechanism of which is readily transported from one position to another dependent upon the exigencies of the situation; to provide a casemate apparatus which, exclusive of motor generator, interrupter, etc., is mounted as a unit on a single panel for ready replacement in the event of damage or failure of a unit to fire; and finally to effect a system wherein the distant selector and its accessories are likewise mounted for such replacement.

With these and other objects in view this invention consists in certain novel details of construction and arrangements of parts to be more particularly set forth and claimed.

Briefly stated, this invention embodies a distant station comprising a group of mines, usually nineteen, suitably submerged off shore, each mine containing a reactance coil grounded through a ball switch, a transformer, the primary coil being grounded, the secondary coil connected to the firing fuse of the mine, a water tight housing submerged in the midst of the group and containing an electro-magnetically controlled selector, the latter functioning as a distributer of electrical energy to the respective mines.

A shore station or casemate cooperating with the distant station and including a 120-volt source of electrical energy which is connected through an interrupter device to the operating line extending between the two stations, the interrupter device serving to impress direct current pulsations of alternating polarity upon the line for the purpose of effecting operation of the distant station and casemate selectors, a 500-volt alternating current source of electrical energy, a semi-automatic trip device in connection with the alternating source for automatically disrupting the 120-volt direct current circuit to the operating line and simultaneously impressing thereon the 500-volt alternating current utilized for firing the mines.

An auxiliary 80-volt source of electrical energy connected to the operating line through a manually operated reversing switch which latter serves to impress direct current impulses of alternating polarity upon the operating line, power, interrupting and synchronizing switches, a current indicating device, an electro-magnetic selector corresponding in construction to that of the distant station and operating in synchronism therewith and manually operated circuit controlling means in connection with said selector to selectively fire any desired mine of the distant station.

Referring more particularly to the accompanying drawings in which corresponding parts are indicated by similar reference characters:

Fig. 1 is the diagrammatic showing of a single conductor submarine mine control system constituting the subject matter of this application.

Fig. 2 is a diagrammatic view of the selector operating circuits, the remaining circuits of the system being omitted.

Fig. 3 is a similar view of the testing circuit.

Fig. 4 is a similar view of the synchronizing circuit.

Fig. 5 is a similar view of the trip circuit for contact firing with the mine in tilted position.

Fig. 6 is a similar view of the trip circuit for observation firing.

Fig. 7 is a similar view of the firing circuit.

Fig. 10 is a fragmentary plan of the selector distributer dial and rotary contact, two of the contacts being shown as connected to the circuit of the mine, and Fig. 11 is a side elevation partially in section illustrating the distributing box and selector disposed therein.

Figure 8:
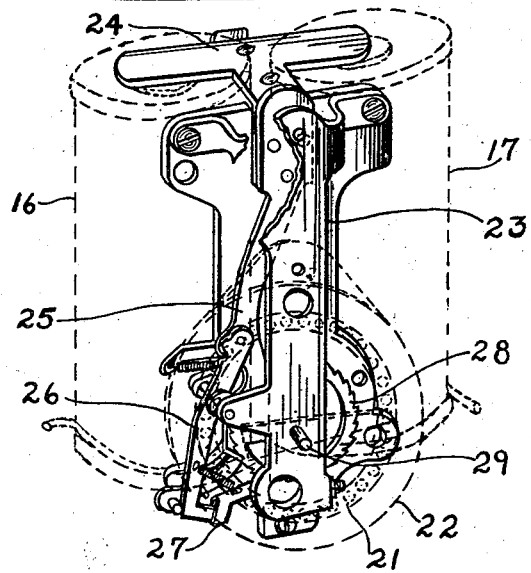
Fig. 8 is a perspective view of the selector mechanism partly in dotted outline and with unessentials omitted.
Figure 9:
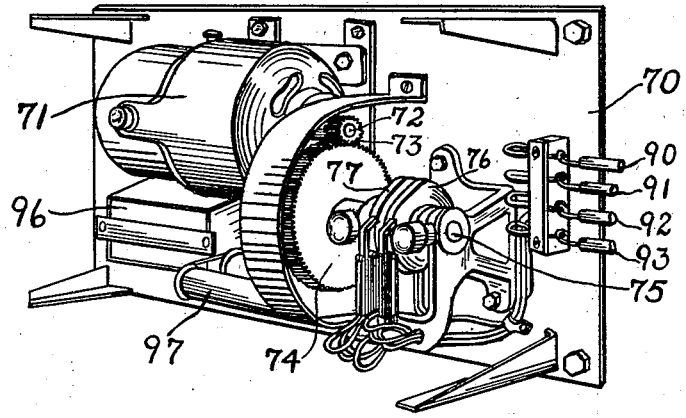
Fig. 9 is a perspective view of the interrupter mechanism and its mounting.

Heretofore submarine mines have been controlled by means of nineteen conductors extending from the casemate to a corresponding number of mines suitably submerged off shore and constituting a mine group. This system however, has been found unsatisfactory in operation owing to the fact that despite all efforts toward improvement, the nineteen conductor cable was costly, short lived and unreliable and was the one weak and unsatisfactory element in the equipment comprising the former standard system of operating controlled mines. For this reason the present system embodying a single cable extending between the casemate and the distant selector mechanism for controlling the respective mines of the group was perfected.

In the illustrated embodiment characterizing this invention reference being had to Fig. 1 of the drawings, there is shown a distant station X and a casemate or shore station Y.

The distant station comprises a mine group U embodying nineteen suitably submerged mines, four of which are shown and designated 1 to 4 respectively. Each mine contains a reactance coil (5), a ball switch (6) including spaced contacts (7) and (8) and a ball (9) adapted to bridge the contacts when the mine has been tilted to the requisite angle. Contact (7) of the switch is connected to one terminal of reactance coil (5), while the other contact (8) is connected to ground (9'), via conductors (10) and (10'), the free end of reactance coil (5) is connected to terminal (11) of the mine.

In addition to the reactance coil (5) each mine also contains a transformer (12), the primary coil (13) thereof having one end connected to ground (9') via conductor (10') and the other end to terminal (11) via conductor (11'). The secondary coil (14) of the transformer is connected at its extremities to the mine fuses (15).

The several mines of the group U are controlled by means of a distant selector A (hereinafter to be described) which is housed in a water tight annular distributing box (13'), adapted to be submerged in the midst of the mine group and briefly stated consists of a base portion (14') and a flanged cover portion (15') which supports the selector A as clearly shown in Fig. 11 of the drawings.

Selector A of the distant station embodies a pair of series-connected electro-magnets (16) and (17) the coils of which are connected at their free ends to selector terminals (18) and (19). The electro-magnets (16) and (17) when energized impart a step-by-step movement to the rotary contact (20) of the selectors so that said contact successively engage contacts (21) of the selector distributing dial (22).

This step-by-step movement is imparted through the instrumentality of an actuating mechanism (23) embracing an armature (24) pivoted intermediate its ends for alternate engagement with the cores of electro-magnets (16) and (17). Armature (24) carries an extension in the nature of an arm (25) the free end of which engages one extremity of the centrally pivoted lever (26), which in turn is provided at one extremity with a dog (27) for engagement with the teeth of ratchet wheel (28).

Journalling shaft (29), of ratchet wheel (28) carries rotary contact (20); the latter as the ratchet wheel is advanced step-by-step due to the alternate engagement of the armature (24) with electro-magnets (16) and (17) being successively brought into engagement with the stationary contacts (21) of the selector distributing dial, as shown in Fig. 8.

The specific construction of the distant station selector A forms no part of the present invention except in so far as it serves to effect distribution of electrical energy to the several mines of group U.

The stationary contacts of the selector distributing dial adapted to be connected to the mines are numbered 30 to 48 respectively. In the present instance but four are shown and these are indicated (30) to (33) and connected to mines numbered 1 to 4 through fuses (30') and mine conductors (35) to (38) inclusive.

Aside from the contacts hereinabove mentioned the distributer dial of the selector also carries an auxiliary contact (20a) which is connected to ground (39) via conductor (40) resistance (41), and conductor (42) terminal (18) and conductor (43). In order to conduct electrical energy to the rotary contact of the selectors for distribution to the mines, said rotary contact is connected with selector terminal (19) via conductor (44).

Having outlined the components and electrical connections of the distant station recourse will now be had to the casemate or shore station Y and its electrical assembly.

The casemate of shore station Y is electrically connected to distant station A by a single operating line E having one end connected with terminal (19) of the distant selector and the other to outlet terminal (45) of the casemate.

To simplify the discussion of the casemate Y its principal assemblies, connections and circuit closers associated therewith will hereinafter be considered as follows: (a) selector B; (b) semi-automatic trip switch L; (c) interrupter C.

*Selector B*:—As the casemate selector B is identical to the selector A at distant station X with respect to distributer dial, rotary contact and electro-magnetically controlled means for traversing the rotary over the stationary contacts and these elements having been previously described further discussion with respect thereto is deemed unnecessary.

The nineteen stationary contacts of selector B instead of being connected to the mines as are those of selector A are connected to a corresponding number of circuit-closers D, four of which are shown on the drawings, as 1a, 2a, 3a and 4a respectively; rotary contact (20) of selector B is connected to ground (49') via conductor (47).

Terminals (18) and (19) of the selector coils (16) and (17) are connected to terminals (a) and (b') of reversing switch F. In regard to this switch, terminals (a) and (b), and (e) and (f) are interconnected; (c) is connected to ground (39') via conductor (43'); and (d) to the electro-magnet R of semi-automatic trip switch L, as will hereinafter appear.

Each circuit-closer of group D embodies a pair of spaced stationary contacts (1b) and (2b) adapted to be bridged by a movable contact (3b). Stationary contacts (2b) of the respective circuit-closers are connected to stationary contacts (30), (31), (32) and (33) respectively of selector B, via conductors (35), (36, (37) and (38); the remaining interconnected contacts (1b) are connected via conductor (45') to terminal (46) of milliammeter J.

*Semi-automatic trip mechanism L*:—This instrument which is employed for the purpose of disrupting the circuit of the operating line and at the same time completing the firing circuit, comprises upper and lower circuit closers P and S and electro-magnet R. Upper circuit closer P includes spaced contacts (53) and (54) and a bridging movable contact (55), contact (53) being connected to terminal (49) of milliammeter J via conductor (56) and contact (54), to contact (d) of reversing switch F via conductor (57).

Lower circuit closer S embodies two stationary contacts (59) and (60) and bridging movable contact (61). Contact (59) being connected via conductor (63) to one pole (62) of a 500-volt A. C. source of electrical energy V, the other pole (62') of which is connected via conductor (64) to ground (65).

The remaining terminal of circuit-closer S is connected via conductor (66) to terminal (54) of circuit-closer P.

Movable contacts (55) and (61) of circuit-closers P and S are simultaneously brought to open and closed position respectively with reference to their stationary contacts by a mechanism, (not shown), controlled by an electro-magnet R; one terminal of which is connected to terminal (46) of milliammeter J, via conductor (67), the other to contact (d) of double throw switch M via conductor (69). The remaining terminals (a), (b), (c), (e) and (f) of switch M will be referred to later.

Manually operated means (not shown) in connection with the movable bridging contacts of switches P and S enables the restoration of said movable contacts to their original position closing the circuit of the operating line and opening the firing circuit.

*Interrupter C:*—This assembly which is utilized for the purpose of automatically supplying direct current pulsations of opposite polarity for the purpose of operating the selectors, includes panel (70) on which there is mounted a motor (71). Armature shaft (72) of the motor is provided with a pinion (73) adapted to mesh with gear (74) of cam shaft (75).

Two cams (76) and (77) of suitable insulating material are keyed to cam shaft (75). Cam (76) is adapted to engage follower (78) disposed intermediate the resilient contact fingers (79) and (80). Finger (79), follower (78) and finger (80) are connected to terminals (81), (82) and (83) respectively.

The companion cam (77) is adapted to engage follower (84) situated between resilient fingers (85) and (86). Finger (85), follower (84) and finger (86) are connected to terminals (87), (88) and (89) respectively. Terminals (82), (88), (81) and (83) are connected to inlet and outlet terminals (90), (91), (92) and (93) respectively. Terminal (87) which is interconnected with terminal (83) is also connected with capacity (96) via conductor (94) while terminal (89) is connected to one end of resistance (97) via conductor (95) the free end of resistance (97) being connected to capacity (96).

Inlet terminals (90) and (91) are connected to a 120-volt source of direct current energy O via conductors (98) and (99). Outlet terminals (92) and (93) are connected to contacts (e) and (f) of manually operated double throw switch M via conductors (100) and (101).

In addition to the 500-volt A. C. and 120 volt D. C. source of electrical energy, a supplemental 80-volt source of direct current energy Q is also provided at the casemate. One pole of said source Q being connected to contact (c) of switch G, via conductor (102), the other pole of said source being connected to terminal d via conductor (103). Contacts (a) and (b) of switch G are connected to contacts (e) and (f) of reversing switch H, via conductors (104) and (105) said contacts (e) and (f) in turn being interconnected with contacts (a) and (b) of switch H. The remaining contacts (c) and (d) are connected to contacts (a) and (b) of switch M via conductors (106) and (107) and the remaining contact of this switch is connected to ground (108) via conductor (107′).

Before passing to the various circuits which this system entails it is deemed advisable at this point to state that neither the selector, semi-automatic trip mechanism nor the interrupter form any part of the invention except in so far as they function to effect its application.

With the various components of the distant station A and casemate B arranged and electrically connected as designated in the preceding descriptive matter the following circuits may be established; (a) selector operating circuit; (b) semi-automatic trip circuit; (c) firing circuit; (d) trip circuit for observation firing; (e) testing circuit and (f) synchronizing circuit, all of which will be hereinafter considered in the order of their presentation.

*Selector operating circuit:*—With the assemblies of the two stations connected as stated and the rotary contacts (20) of the respective selectors for example on stationary contacts (33); to render the system effective the operator at the casemate closing the double throw power switch M (Figs. 1 and 2) to interconnect contacts (c) and (e) and (d) and (f) of said switch establishes the circuit to wit: one pole of the 120-volt source of electrical energy O, conductor (98), inlet terminal (90) of interrupter C, terminal (82) to follower (78), spring finger (79) outlet terminal (92), conductor (101), contact (f) of switch M, contact (d), conductor (69), electro-magnet R of semi-automatic trip mechanism L, conductor (67), terminal (46) of milliammeter J, through milliammeter to terminal (49), conductor (56), to terminal (53) of switch P, movable contact (55), terminal (54) to outlet terminal (45) of the casemate.

At terminal (45) two circuits are provided, one to casemate selector B which includes conductor (57), contact (d) of reversing switch F, contact (b) thereof terminal (19) of the selector, series connected coils of electromagnets (17) and (16), terminal (18), contact (a) of switch F, contact (c), conductor (43′) and ground (39′); the other to the selector A at the distant station which embraces operating line E, terminal (19), series connected coils of electro-magnets (17) and (16), terminal (18), conductor (43) and ground (39).

From ground (39) at the distant station A, ground (39') at the casemate, the selector operating circuits are completed through ground (108) at the casemate, conductor (107'), contact (c) of double throw power switch M, contact (e), conductor (100) to the inlet terminal (93) of interrupter C, thence to terminal (83), terminal (87), spring finger (85), follower (84), terminal (88) to outlet terminal (91) of the interrupter and thence through conductor (99) to the opposite pole of the 120-volt source of direct current energy O.

The alternating impulses of opposite polarity impressed upon the selector operating circuits, through the agency of interrupter C, energizes the electro-magnets of the selectors A and B and by virtue of the selector mechanism coacting therewith simultaneously actuates the rotary contacts of the two selectors to effect their successive engagement with the stationary contacts of said selector.

In this connection it may be stated the R. P. M. of the rotary contacts (20) is based upon the maximum speed and length of the modern cruiser so that should one of the mines, for instance No. 4, be struck by a vessel just as the rotary contact (20) is leaving the stationary contact (33), to said mine, the rotary contact will return to said stationary contact (33) before the vessel has cleared the mine.

*Automatic trip circuit for contact firing:—*
The respective selectors at the distant and casemate stations being in operation and their rotary contacts, and synchronously engaging the stationary contacts of the distributing dial, let it be assumed that a vessel contacts with mine No. 4 (Fig. 5).

On impact, ball switch (6) grounds reactance coil (5) and establishes two circuits from terminal (19) of the distant station selector one including conductor (44), rotary contact (20), stationary contact (33), fuse (33'), conductor (38), line terminal (11), reactance coil (5), contact (7) of switch (6), ball (9), contact (8), conductors (10) and (10') to ground (9').

Normally the operating circuit through electro-magnet R of the semi-automatic trip mechanism is in no wise effective relative to the operation of said magnet, but the excess current flow produced by grounding reactance coil (5) and primary (13) of the transformer is such as to render the electro-magnet R active so that through mechanism (not shown), movable contact (55) of switch P is disengaged with respect to its stationary contacts (53) and (54) and the operating circuits to the distant and casemate selectors disrupted which instantly stops the rotary contacts of said selectors on the stationary contacts corresponding to the mine struck.

*Firing circuit:—*Simultaneous with the disruption of the operating circuit, a firing circuit (Figs. 1 and 7) is completed through switch S, whose movable contact operates in unison with that of switch P. This firing circuit includes one pole of 500-volt A. C. source of electrical energy V, pole (62), conductor (63), stationary contact (59) of switch S, movable contact (61), stationary contact (60), conductor (66), stationary contact (54) of switch P, outlet terminal (45), operating line E, terminal (19), conductor (44), rotary contact (20), stationary contact (33), fuse (33'), conductor (38), mine terminal (11), conductor (11'), primary coil (13) of transformer (12), conductor (10') to ground (9'). Completion of this circuit is effected through ground (65) at the casemate and conductor (64) to the opposite pole (62) of source V. The current induced in the secondary (14) of the transformer (12) blows fuses (15) and explodes the mine.

The explosion of the mine is followed by the grounding of the electrical conductor of the cable (38). This grounding of the cable, occurring before the 500-volt A. C. is switched off, permits a current flow through the ground sufficient in value to blow fuse (33') thus opening the circuit and clearing out the grounded cable (38).

*Manually controlled trip circuit for observation firing:*—Under some conditions and circumstances it may be desirable to fire one or more of the mines from the casemate and to this end the nineteen circuit-closers D are connected to the contacts of the selector B at the casemate, as previously described.

Let it be supposed the operator at the casemate desires to fire mine No. 4 from the casemate, switch M being in the normal selector operating position and switch (4a) of group D closed, the circuit is formed to wit: (Figs. 1 and 6). From one pole of the 120-volt source to the interrupter through the latter as previously described to contacts (f) and (d) of switch M, conductor (69), electromagnet R, conductor (67), terminal (46) of milliameter J, conductor (45'), interconnected contacts (1b) of circuit-closers D to circuit-closer (4a), thence through stationary and movable contacts (1b), (2b) and (3b) to stationary contact (33) of the selector, rotary contact (20), conductor (47), to ground (49').

This circuit is completed through ground (108) at the casemate, conductor (107'), contacts (c) and (e) of switch M to terminal (93) of the interrupter and through the latter to the source O.

Completion of the circuit just defined, produces an excess current flow through the electro-magnetic coil R of automatic trip mechanism and energizes said magnet to an extent sufficient to trip switch P and simultaneously close switch S, thus disrupting the selector operating circuits and closing the firing circuit as hereinbefore described.

*Testing circuit:*—In order to insure proper functioning of the system, it is essential that the operator be enabled from time to time to ascertain the condition of the system with respect to grounds and blown fuses, and for this purpose testing circuits are provided and the tests are made with current supplied from the 80-volt source of direct current energy Q.

Assuming switch G to be in the closed position and switch M thrown to the position interconnecting stationary contacts (a) and (c) and (b) and (d) (Figs. 1 and 3), the following circuits will be established: one pole of 80-volt direct current source Q, conductor (102), interconnected contacts (a) and (c) of switch G, conductor (104), stationary contacts (e), (b) and (d) of reversing switch H, conductor (106), stationary contacts (b) and (d) of power switch M, conductor (69), electro-magnetic coil R of automatic trip mechanism L, conductor (67), terminals (46) and (49) of milliameter J, conductor (56), stationary contact (53) of switch P, movable contact (55) thereof, stationary contact (54), terminal (45), operating line E to terminal (19) of the distant station selector A, coils (17) and (16) of the selector, terminal (18) conductor (43) to ground (39).

At terminal (19) of the distant selector A another circuit is established including conductor (44), rotary contact (20), stationary contact (33), fuse (33') conductor (38), mine terminal (11), conductor (11'), primary (13) of mine transformer (12), conductor (10') and ground (9').

From the two grounds (39) and (9') at the distant station the circuit is completed through ground (108), at the casemate, conductor (107'), interconnected contacts (c) and (a) of switch M, conductor (107), stationary contacts (c), (a) and (f) of reversing switch H, conductor (105), interconnected stationary contact (b) and (d) of switch G, conductor (103), back to the opposite pole of source Q.

The circuits just described consist primarily of those to be tested, namely, the operating line or cable E connecting the shore and distant stations, the fuse (31), the mine cable (38) and the circuits within the mine, mine terminal (11), conductor (11'), primary (13) of mine transformer (12), conductor (10') and ground (9').

The condition of the circuit is shown by the amount of current flowing in the circuit as indicated by the milliameter J. These indications are interpreted, as follows: For any given installation, the total resistance of the circuit being known, the amount of current flowing when an E. M. F. of 80-volts is impressed on the circuit, is computed. When this amount of current is indicated by the milliameter J, it is known as a normal reading and shows that the circuit is free from faults. A reading less than normal indicates to the operator a high resistance or open circuit, while a reading greater than normal is an indication of grounds in the circuit.

Each mine cable and mine circuit is tested in turn by successive reversals of the reversing switch H and noting reading of milliameter J for each mine contact.

*Synchronizing circuits:*— Occasionally during the operation of the system the rotary contacts of the selectors A and B may get out of step in which event it is highly important that synchronism be restored, and to meet this contingency a synchronizing circuit is provided between the distant and casemate stations as will hereinafter appear.

As previously stated, each of the selectors A and B includes an auxiliary contact (20a), that of selector A being connected to ground (39) through conductor (40), resistance (41), and conductors (42) and (43); that of casemate selector B being connected to terminal (49) of milliameter J, through conductor (48'), switch K, conductor (50), resistance (51) and conductor (52).

The combined effect of the resistance elements (41) and (51) in connection with the distance and casemate selectors A and B respectively, equals the resistance imposed by the primary of mine transformer (12), consequently when rotary contacts (20) of selectors A and B are in engagement with stationary contacts (20a) the milliammeter will register a normal reading, that is to say the reading will correspond to that which would be registered if the current travelled through the primary coil (13) of transformer (12) to ground (9') as in the normal operation of the system.

In the light of the preceding premise if the rotary contact of distant selector A is in engagement with stationary contact (20a), and the rotary contact of casemate selector B in engagement with stationary contact (48), then as the current at the distant station is traversing the circuit including resistance (41), which in value is more than double that of the resistance imposed by the primary (13) of mine transformer (12) during normal operation of the system and as an open circuit condition prevails at the casemate selector B the milliammeter reading will be less than normal.

On the other hand, should the foregoing conditions be reversed, that is to say, if rotary contact 20) of the distant station selector A is in engagement with stationary contact (48) and the rotary contact (20) of casemate selector B is in engagement with stationary contact (20a), the increased current flow resulting from the circuit including primary coil (13) of the mine transformer plus the casemate circuit embracing resistance (51) will be indicated on the milliammeter by a reading in excess of normal.

The operator at the casemate having noted from the milliammeter reading, the non-synchronization of the rotary contacts of the respective selectors A and B interrupts the normal 120-volt operating circuit by opening power switch M with respect to its stationary contacts (e) and (f) and closing said switch relative to contacts (c) and (a) and (d) and (b).

After positioning switch M as stated and closing power switch G, the operator next proceeds to repeatedly operate reversing switch H in order to transmit direct current impulses of alternating polarity to the distant and casemate selectors A and B and step the rotary contacts (20) of said selectors around the distributing dial until rotary contact (20) of distant selector A is in engagement with stationary contact (20a), which position of the rotary contact (20) of the distant selector A is indicated to the operator by the less than normal reading of the milliammeter J. When this indication obtains, the operator steps the rotary contact (20) of the casemate selector B around by repeatedly reversing switch F until the rotary contact (20) of the casemate selector B is in engagement with stationary contact (20a). This position of the said contact is indicated in two ways, by visual inspection of the position of the contact and by the return to a normal reading of the milliammeter J.

Both rotary contacts being on stationary contacts (20a) the 120-volt normal operating circuit is restored by means of switch M and the system is again placed in operation with the two rotary contacts of the respective selectors A and B properly synchronized.

In conclusion it is manifest this invention provides a system of single conductor submarine mine control having facilities to automatically fire any mine of the group upon contact; to explode any desired mine for observation purposes; to test the system for grounds and blown fuses; to indicate at the casemate the position of the rotary contact of the distant station selector; to permit the operator to readily synchronize the rotary contacts of the respective selectors and maintain them in this condition throughout the operative period of the selectors and to enable the entire system, should the occasion arise to be quickly and instantly rendered harmless.

Although in the foregoing certain elements such as the selectors, automatic trip mechanism and interrupter, have been defined as best adapted to perform the functions allotted to them, nevertheless it is to be understood that similar elements functioning in like manner may be utilized without departing from or sacrificing any of the principles of this invention.

What I claim as new and wish to secure by Letters Patent is:

1. A system of submarine mine control comprising a plurality of submerged mines, a remote control, a single conductor interconnecting mines and remote control to provide a path of electrical distribution therebetween and means for automatically firing any of said mines on impact.

2. A system of submarine mine control comprising a plurality of submerged mines, a remote control, a single conductor interconnecting mines and remote control to supply a path of electrical distribution therebetween and means in connection with the mines and remote control for selectively discharging any of said mines on impact.

3. A system of submarine mine control comprising a plurality of submerged mines, a remote control, a single conductor interconnecting mines and remote control to supply a path of electrical distribution therebetween and means in connection with the mine and remote control for selectively discharging any mine of the series which has been sufficiently tilted by impact.

4. A system of submarine mine control comprising a series of submerged mines, a remote control, a single conductor interconnecting mines and remote control to supply a path of electrical distribution therebetween, means in connection with the mines and remote control for selectively discharging any desired mine of the series, and additional means in connection with said mines and remote control for automatically firing any of the mines on impact.

5. A system of submarine mine control comprising a plurality of submerged mines, a remote control, a single conductor interconnecting mines and remote control to provide a path of electrical communication therebetween, means to selectively discharge said mine on impact, said means including normally open mine and firing circuit, sources of electrical supply for the respective circuits, means for successively closing the mine circuit through the respective mines and means in connection with the mine circuit and remote control for disrupting the mine circuit and closing the firing circuit of the mine struck.

6. A system of submarine mine control comprising a series of submerged mines, a remote control, a single conductor interconnecting mines and remote control to provide a path of electrical distribution therebetween, normally open mine and firing circuits, sources of electrical supply for the respective circuits located at the remote control, means for successively closing the mine circuit through the respective mines and means in connection with the mine and remote control to disrupt the mine circuit and close the firing circuit when any mine of said series has been sufficiently tilted by impact.

7. A system of submarine mine control comprising a series of submerged mines, a remote control, a single conductor interconnecting mines and remote control to provide a path of electrical distribution therebetween, normally open mine and firing circuits, sources of electrical supply for the respective circuits, means for successively closing the mine circuit through the respective mines and means in connection with the remote control to disrupt the mine circuit and close the firing circuit through any desired mine of said series, and additional means in connection with said mines and remote control for automatically firing any of said mines on impact.

8. A system of submarine mine control comprising a series of submerged mines, a remote control, a single conductor interconnecting the mine and remote control to provide a path of electrical distribution therebetween, normally open mine and firing circuits, sources of electrical supply at the remote control for the respective circuits, a continuously operating selector mechanism located adjacent to and coacting with said mines to successively establish the mine circuit through the respective mines and means in connection with the mine circuit and remote control to interrupt said mine circuit and close the firing circuit through said mines when any one of the latter has been tilted to a predetermined angle by impact.

9. A system of submarine mine control embodying a series of submerged mines, a remote control, a single conductor interconnecting mines and remote control to provide a path of electrical distribution therebetween, a normally open mine circuit, a source of supply for said circuit, means for successively establishing the mine circuit through the respective mines, a normally open firing circuit, means controlled by the mine circuit for opening the latter and simultaneously closing the firing circuit, said means being responsive only to an increase current flow through the mine circuit and means in connection with the respective mines to increase the current flow therethrough when any mine of the series has been sufficiently tilted by impact.

10. A system of submarine mine control comprising a series of submerged mines, a remote control, a single conductor connecting the mine, a remote control to provide a path of electrical distribution therebetween, means to selectively fire any of said mines on impact, said means including a mine circuit, a normally open firing circuit, sources of electrical supply for the respective circuits, means controlled by the mine circuit and cooperating with the latter and the firing circuit to disrupt the mine circuit and close said firing circuit, said means being responsive only to an increase current flow through the mine circuit and means in connection with the respective mines to increase the mine flow through the circuit of the mine struck when said mine has been tilted to a predetermined angle by impact.

11. A submarine mine control comprising a series of submerged mines, a remote control, a single conductor between mines and remote control to establish a path of electrical distribution therebetween, means to selectively fire any of said mines upon impact, said means including a normally open mine circuit, a normally open firing circuit, a source of electrical supply for the respective circuits, means for successively establishing the mine circuit through the respective mines, electromagnetic means controlled by the mine circuit and cooperating with the latter and the firing circuit to simultaneously disrupt the mine circuit and close the firing circuit, said means being responsive only to an increase current flow through the mine circuit and means in connection with the respective mines to increase the current flow through the circuit of the mine struck when said mine has been sufficiently tilted by impact.

12. A submarine mine control comprising a series of submerged mines, a remote control, a single conductor between mines and remote control to establish a path of electrical distribution therebetween, means to selectively fire any of said mines upon impact, said means including a normally open mine circuit, a normally open firing circuit, a source of electrical supply for the respective circuits, means for successively establishing the mine circuit through the respective mines, electro-magnetic means controlled by the mine circuit and cooperating with the latter and the firing circuit to simultaneously disrupt the mine circuit and close the firing circuit, said means being responsive only to an increase current flow through the mine circuit and means in connection with the respective mines to increase the current flow through the circuit of the mine struck when said mine has been tilted to a predetermined angle by impact.

13. A system of submarine mine control comprising a series of submerged mines, a remote control, a single conductor interconnecting mines and remote control to provide a path of electrical distribution therebetween, means to selectively fire any of said mines on impact, said means including an operating circuit, a normally open mine circuit, a source of supply common to said circuits, a normally open firing circuit, a source of supply for said circuit, means located adjacent the mines and controlled by the operating circuit to successively establish the mine circuit through the respective mines, an electro-magnetically controlled mechanism coacting with the respective circuits to disrupt the mine and operating circuits and simultaneously closing the firing circuit, said mechanism being responsive only to an increase of current flow through the mine circuit and means in connection with the respective mines to increase the current flow through the circuit of the mine struck when said mine has been sufficiently tilted by impact.

14. A system of submarine mine control, comprising a series of submerged mines, a remote control, a single conductor interconnecting remote control and mines to provide a path of electrical distribution therebetween, means to selectively fire any of said mines on impact, said means including an operating circuit, a normally open mine circuit, a source of supply common to said circuit, a normally open firing circuit, a source of electrical supply for said firing circuit, a selector mechanism located contiguous the mine and responsive to the operating circuit to successively complete the mine circuit through the respective mines, electro-magnetically controlled means included in the mine circuit and located at the remote control, said means coacting with the respective circuits to disrupt the mine and operating circuits and simultaneously close the firing circuit, said electro-magnetically controlled means being responsive only to an excess flow of current through the mine circuit and means in connection with the respective mines to increase the current flow through the circuit of the mine struck when said mine has been tilted to a predetermined angle by impact.

15. A system of submarine mine control comprising a series of submerged mines, a remote control, a single conductor, interconnecting mines and remote control to provide a path of electrical distribution therebetween, means located at the casemate to selectively fire any of said mines from the remote control, said means including normally open mine and firing circuits, sources of electrical supply for the respective circuits, means for successively establishing the mine circuit through the respective mines, an electro-magnetic means controlled by the mine circuit and coacting with the latter and the firing circuit to simultaneously disrupt said mine circuit and close the firing circuit, said means being responsive only to an excess flow of current through the mine circuit and means located at the remote control for producing an excess flow of current through any desired mine circuit.

16. A system of submarine mine control comprising a series of submerged mines, a remote control, a single conductor interconnecting mines and remote control to provide a path of electrical distribution therebetween, means located at the remote control to selectively fire any of said mines from the remote control, said means including normally open mine and firing circuits, sources of electrical supply for the respective circuits, means for successively establishing the mine circuit through the respective mines, means controlled by the mine circuit and coacting with the latter and the firing circuit to simultaneously disrupt said mine circuit and close the firing circuit, said means being responsive only to an excess flow of current through the mine circuit, means located at the remote control for producing an increase flow of current through the circuit of any desired mine of said series.

17. A system of submarine mine control comprising a series of submerged mines, a remote control, a single conductor interconnecting the mines and remote control to provide a path of electrical distribution therebetween, means for selectively firing any of said mines on impact, said means including normally open mine and firing circuits, sources of electrical supply for the respective circuits, and means for successively establishing the mine circuit through the respective mines, an electro-magnetic means controlled by the mine circuit and coacting with the firing circuit to simultaneously disrupt the mine circuit and close said firing circuit, said electro-magnetic means being responsive only to an increase current flow through the mine circuit, a trip circuit in connection with the respective mines, and means included in said trip circuit and coacting with the established mine circuit to increase the flow of current through said mine circuit when the mine has been sufficiently tilted by impact.

18. A system of submarine mine control comprising a series of submerged mines, a remote control, a single conductor interconnecting mines and remote control to provide a path of electrical distribution therebetween, means to selectively fire any of said mines on impact, said means including an operating circuit, normally open mine and firing circuits, sources of electrical supply for the respective circuits, a selector mechanism situated contiguous the mines and controlled by the operating circuit to successively establish the mine circuit through the respective mines, an electro-responsive device included in the mine circuit and located at the remote control, means actuated by said device to disrupt the mine and operating circuits and simultaneously close the firing circuit, said electro-responsive device being effective only on an increase current flow through the mine circuit, a trip circuit in connection with the respective mines, means included in said circuit and coacting with the mine circuit to increase the flow of current through the mine circuit when said mine has been sufficiently tilted by impact.

19. A system of submarine mine control comprising a distant station, a casemate station, a single conductor interconnecting the two stations to provide a path of electrical distribution therebetween, an electro-magnetically controlled selector located at each of said stations, the respective selectors including a series of stationary contacts and a rotary contact adapted to travel thereover, the rotary contacts of the two selectors being operated in synchronism, an operating circuit for said selectors, normally open mine and firing circuits, the mine circuit including the rotary and stationary contacts of the distant selector, sources of electrical supply for the respective circuits, means in connection with the distant station selector to successively close the mine circuit through the respective mines, means at the casemate station controlled by the mine circuit to open the latter and said operating circuit and simultaneously close said firing circuit, said means being responsive only to an excess flow of current through the mine circuit and means associated with the respective circuits to produce such increased current flow when any of said mines has been sufficiently tilted by impact.

20. A system of submarine mine control comprising a distant station, a casemate station, a single conductor interconnecting the two stations to provide a path of electrical distribution therebetween, an electro-magnetically controlled selector located at each of said stations, the respective selectors including a series of stationary contacts and a rotary contact adapted to travel thereover, the rotary contacts of the two selectors being operated in synchronism, an operating circuit for said selector, normally open mine and firing circuits, the mine circuit including the rotary and stationary contacts of the distant selector, sources of electrical supply for the respective circuits, means in connection with the distant station selector to successively close the mine circuit through the respective mines, means at the casemate station controlled by the mine circuit to open the latter and said operating circuit and simultaneously close said firing circuit, said means being responsive only to an excess flow of current through the mine circuit and means associated with the respective mines to produce such increased current flow when any one of said mines has been sufficiently tilted by impact and additional means in connection with the casemate selector to selectively close the firing circuit to any desired mine of the series.

21. A system of submarine mine control comprising a distant station, a casemate station, a single conductor interconnecting the two stations to provide a path of electrical distribution therebetween, an electro-magnetically controlled selector located at each of said stations, the respective selectors including a series of stationary contacts and a rotary contact adapted to travel thereover, the rotary contacts of the two selectors being operated in synchronism, an operating circuit for said selectors, normally open mine and firing circuits the mine circuit including the stationary and rotary contacts of the distant selector, sources of electrical supply for the respective circuits, means in connection with the distant station selector to successively close the mine circuits through the respective mines, electro-magnetically controlled means located at the casemate station and operated by the mine circuit to open the latter and said operating circuit and at the same time close said firing circuit, said means being responsive only to an excess flow of current through the mine circuit and means associated with the respective mines to produce such increase flow of current when any one of said mines has been sufficiently tilted by impact.

22. A system of submarine mine control comprising a distant station, a casemate, a single conductor interconnecting the two stations to provide a path of electrical distribution therebetween, an electro-magnetically controlled selector located at each of said stations, the respective selectors including a series of stationary contacts and a rotary contact adapted to travel thereover, the rotary contacts of the two selectors being operated in synchronism, an operating circuit for said selectors, normally open mine and firing circuits, the mine circuit including the rotary and stationary contacts of the distant selector, sources of electrical supply for the respective circuits, means in connection with the distant station selector to successively close the mine circuits through the respective mines, an electro-magnetically controlled means located at the casemate station and operated by the mine circuit to open the latter and said operating circuit and at the same time close said firing circuit, said means being responsive only to an excess flow of current through the mine circuit, means associated with the respective mines to produce such increased current flow when any one of said mines has been sufficiently tilted by impact and additional means associated with the casemate selector to selectively close the firing circuit of any desired mine of the series.

23. A system of submarine mine control comprising a distant station, a casemate, a single conductor interconnecting the two stations to provide a path of electrical distribution therebetween, an electro-magnetically controlled selector located at each of said stations, the respective selectors including a series of stationary contacts and a rotary contact adapted to travel thereover the rotary contacts of the two selectors being operated in synchronism, means coacting with the rotary contacts of the selector to impart a step-by-step movement thereto, said means being responsive to direct current pulsations of alternating polarity, an operating circuit, a mine circuit, means located at the casemate station for imparting direct current pulsations of opposite polarity on the mine and operating circuits, a firing circuit, a source of supply for said circuit, means in connection with the distant station selector to successively close the mine circuit through the respective mines, means at the casemate station controlled by the mine circuit to open the latter and said operating station and simultaneously close said firing circuit, said mines being responsive only to an increase flow of current through the mine circuit and means associated with the respective mines to provide such increased flow of current when any one of said mines has been sufficiently tilted by impact.

24. A system of submarine mine control comprising a distant station, a casemate station, a single conductor interconnecting the two stations to provide a path of electrical distribution therebetween, an electro-magnetically controlled selector located at each of said stations, the respective stations including a series of stationary contacts and a rotary contact adapted to travel thereover, the rotary contact of the two selectors being normally operated in synchronism, an operating circuit for said selectors, normally open mine and firing circuits, the mine circuit including the rotary and stationary contacts of the distant selector, sources of electrical supply at the casemate for the respective circuits, means in connection with the distant station selector to selectively close the mine circuit through the respective mines, means at the casemate station and coacting with the selector operating circuit to effect independent functioning of said selectors, electro-magnetically controlled means at the casemate station cooperating with the respective circuits to open the mine and operating circuits and simultaneously close the firing circuit, said means being responsive only to an excess flow of current through the mine circuit and means associated with the respective mines to produce such increased current flow when any one of said mines has been sufficiently tilted by impact.

25. A system of submarine mine control comprising a distant station, a casemate station, a single conductor interconnecting the two stations to provide a path of electrical distribution therebetween, an electro-magnetically controlled selector located at each of said stations, the respective selectors including a series of stationary contacts and a rotary contact adapted to travel thereover, the rotary contacts of the two selectors being operated in synchronism, an operating circuit for said selectors, normally open mine and firing circuits, the mine circuit including the rotary and stationary contacts of the distant station selector, sources of electrical supply at the casemate for the respective circuits, means in connection with the distant station selector to successively close the mine circuit through the respective mines, means associated with the respective selectors to effect synchronization thereof, means at the casemate station controlled by the mine circuit to open the latter and said operating circuit and simultaneously close said firing circuit, said means being responsive only to an excess flow of current through the mine circuit and means in connection with the respective mines to produce such increased current flow when any one of said mines has been sufficiently tilted by impact.

26. A system of submarine mine control comprising a distant station, a casemate station, a single conductor interconnecting the two stations to provide a path of electrical distribution therebetween, an electro-responsive selector mechanism located at the respective stations, operating circuits for the respective selectors, a mine circuit, a source of electrical energy common to both circuits, means in connection with the distant station selector to successively establish the mine circuit through the respective mines, means in connection with the distant and casemate selector to effect synchronous operation thereof, means at the casemate to indicate synchronization of the selectors, electro-mechanically controlled means located at the casemate station and included in the mine and operating circuits, said means cooperating with the respective circuits to open the mine and operating circuits to simultaneously close the firing circuit, said means being responsive only to an increase flow of current through the mine circuit and means in connection with the respective mines to produce such increased current flow when any of said mines has been sufficiently tilted by impact.

PAUL R. NELSON.